(12) United States Patent
Arif et al.

(10) Patent No.: US 11,704,668 B1
(45) Date of Patent: *Jul. 18, 2023

(54) FUNDS TRANSFER AUTHENTICATION

(71) Applicant: Wells Fargo Bank, N.A., San Francisco, CA (US)

(72) Inventors: Mohammed Arif, Raichur (IN); Sajeev Philip, Bangalore (IN); Shanmukeswara Rao Donkada, Hyderabad (IN); Ramanathan Ramanathan, Bellevue, WA (US); Jayasree Iyer, Bengaluru (IN); Mathewbabu Edappilly Antony, Bangalore (IN); Rameshchandra Bhaskar Ketharaju, Hyderabad (IN); Amit Tripathi, Bangalore (IN); Arun Raj, Bangalore (IN); Poornima Mahabeleshwarappa, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/579,978

(22) Filed: Jan. 20, 2022

Related U.S. Application Data

(63) Continuation of application No. 16/170,930, filed on Oct. 25, 2018, now Pat. No. 11,263,631.

(51) Int. Cl.
*G06Q 20/40* (2012.01)
*G06Q 20/32* (2012.01)
*G06Q 50/00* (2012.01)

(52) U.S. Cl.
CPC ..... *G06Q 20/4014* (2013.01); *G06Q 20/3223* (2013.01); *G06Q 50/01* (2013.01)

(58) Field of Classification Search
CPC . G06Q 20/4014; G06Q 20/3223; G06Q 50/01
See application file for complete search history.

(56) References Cited

U.S. PATENT DOCUMENTS

| | | | |
|---|---|---|---|
| 6,321,213 B1 | 11/2001 | Ito et al. | |
| 7,711,621 B2 | 5/2010 | Huang et al. | |
| 7,822,688 B2 | 10/2010 | Labrou et al. | |
| 7,844,546 B2 | 11/2010 | Fleishman et al. | |
| 8,229,855 B2 | 7/2012 | Huang et al. | |
| 8,515,870 B2 | 8/2013 | Oskolkov et al. | |
| 8,626,661 B2 | 1/2014 | Gilder | |

(Continued)

*Primary Examiner* — Bruce I Ebersman
*Assistant Examiner* — Matthew Cobb
(74) *Attorney, Agent, or Firm* — Womble Bond Dickinson (US) LLP

(57) ABSTRACT

The innovation disclosed and claimed herein, in me aspect thereof, comprises systems and methods of funds transfer authentication. The authentication can include receiving a transfer request to transfer funds from a payer to a payee, the transfer request identifies the payer, the payee, and an amount to transfer. Customer information associated respectively with the payer and the payee is identified. The payer and the payee are authenticated. A communication session is opened between the payer and payee. A time-limited payee OTP is generated and sent to the payee. The payee OTP is received within a first time limit. The funds are transferred from the payer to the payee based on receiving a matching payee OTP.

14 Claims, 6 Drawing Sheets

(56) References Cited

U.S. PATENT DOCUMENTS

| | | | |
|---|---|---|---|
| 8,639,602 B2 | 1/2014 | Rao | |
| 8,924,292 B1* | 12/2014 | Ellis | G06Q 20/3821 705/41 |
| 8,959,032 B2* | 2/2015 | Fernandes | G06Q 20/40 705/44 |
| 10,057,225 B1 | 8/2018 | Hayes et al. | |
| 10,200,364 B1 | 2/2019 | Ketharaju et al. | |
| 10,210,498 B1 | 2/2019 | Meyyappan et al. | |
| 10,853,798 B1 | 12/2020 | Maeng et al. | |
| 2009/0327133 A1* | 12/2009 | Aharoni | G06Q 20/40 707/999.2 |
| 2011/0282788 A1 | 11/2011 | Allison, Jr. et al. | |
| 2012/0323786 A1 | 12/2012 | Kirsch | |
| 2013/0085942 A1 | 4/2013 | Shirol | |
| 2013/0124416 A1* | 5/2013 | Pawar | G06Q 20/10 705/44 |
| 2014/0164226 A1 | 6/2014 | Gorodish | |
| 2015/0058950 A1 | 2/2015 | Miu | |
| 2015/0066765 A1 | 3/2015 | Banks et al. | |
| 2015/0164226 A1 | 6/2015 | Battey et al. | |
| 2016/0358162 A1 | 12/2016 | Park et al. | |
| 2017/0169407 A1 | 6/2017 | Vaananen | |
| 2018/0335928 A1 | 11/2018 | Van Os et al. | |

\* cited by examiner dock
FUNDS TRANSFER AUTHENTICATION

CROSS-REFERENCE TO RELATED APPLICATIONS

This application is a continuation of U.S. patent application Ser. No. 16/170,930, filed Oct. 25, 2018, the entire contents of which are incorporated herein by reference.

BACKGROUND

Transferring funds electronically or digitally is becoming increasingly prevalent. Additionally, transferring funds internationally or across borders has become more common than in previous years. Sending funds digitally creates issues that are not usually present in face to face transactions. There are usually no methods to confirm the identity of the receiver prior to receiving the funds. Further, the recipient can deny being the actual recipient of the funds.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of funds transfer authentication. The authentication can include receiving a transfer request to transfer funds from a payer to a payee, the transfer request identifies the payer, the payee, and an amount to transfer. Customer information associated respectively with the payer and the payee is identified. The payer and the payee are authenticated. A communication session is opened between the payer and payee. A time-limited payee OTP is generated and sent to the payee. The payee OTP is received within a first time limit. The funds are transferred from the payer to the payee based on receiving a matching payee OTP.

A system of the innovation can include a request component that receives a transfer request to transfer funds from a payer to a payee, the transfer request identifies the payer, the payee, and an amount to transfer. A data component identifies customer information associated respectively with the payer and the payee. An authentication component authenticates the payer and the payee. A communication component opens a communication session between the payer and payee, and comprises. An OTP component generates and sends a time-limited payee OTP to the payee, and receives the payee OTP within a first time limit. A transfer component transfers the funds from the payer to the payee upon receiving the payee OTP within the first time-limit.

A computer readable medium has instructions to control one or more processors configured to receive a transfer request to transfer funds from a payer to a payee, the transfer request identifies the payer, the payee, and an amount to transfer. The instructions identify customer information associated respectively with the payer and the payee. The instructions authenticate the payer and the payee. The instructions open a communication session between the payer and payee. The instructions send a time-limited payee OTP to the payee and send a time-limited payer OTP to the payer. The instructions receive the payee OTP within a first time limit and receive the payer OTP within a second time limit. The instructions transfer the funds from the payer to the payee based on receiving the OTPs within the time limits.

In aspects, the subject innovation provides substantial benefits in terms of authentication and transactional security. One advantage resides in a more secure knowledge of the identity of the payee. Another advantage resides in an irrefutable confirmation that the payee received the transfer.

To the accomplishment of the foregoing and related ends, certain illustrative aspects of the innovation are described herein in connection with the following description and the annexed drawings. These aspects are indicative, however, of but a few of the various ways in which the principles of the innovation cam be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
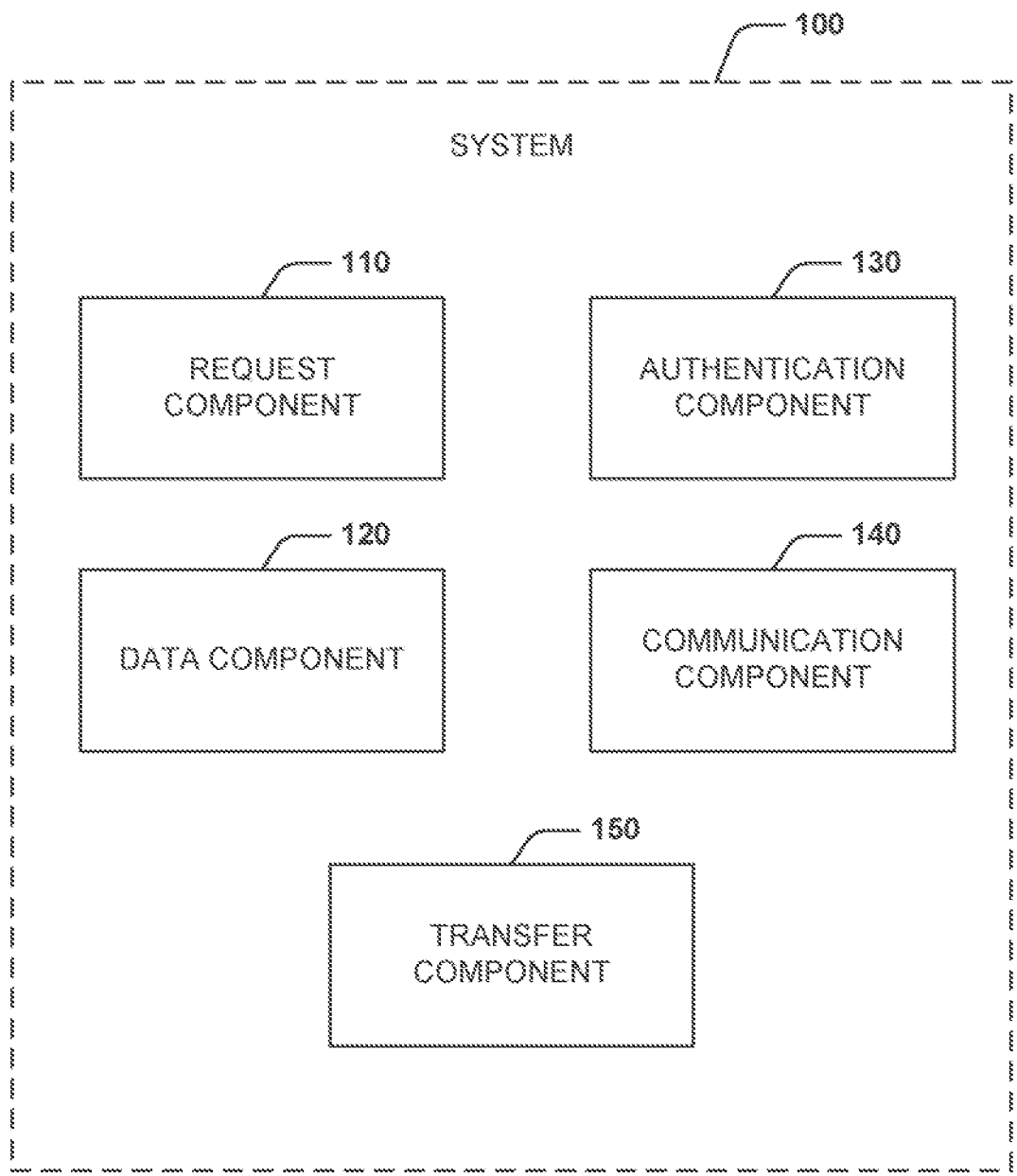
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system". "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for funds transfer authentication. The system includes a request component 110. The request component 110 receives a transfer request from a payer to transfer funds from the payer to a payee. The request component parses the transfer request to extract information regarding the funds transfer. The transfer request includes information that identifies the payer, the payee, and an amount to transfer.

The system 100 includes a data component 120. The data component 120 identifies customer information associated respectively with the payer and the payee. The customer information can include account information, contact information, social network data, and/or the like of the payer, the payee, associated financial institutions, and/or the like. The data component 120 can mine customer data from online resources, provided data, data included in the transfer request, and/or the like. In some embodiments, the data component 120 can store the collected information in a central depository that can be accessed remotely by the system 100 to complete funds transfers.

The system 100 includes an authentication component 130. The authentication component 130 authenticates the payer and/or the payee. In some embodiments, the authentication component 130 authenticates the payer and/or the payee prior to proceeding with connecting the payer and payee to complete the transfer of funds.

The authentication component 130 can register the payer, the payee, and/or associated financial institutions of the payer and/or the payee. In some embodiments, the authentication component 130 registers the payer and/or the payee to begin a funds transfer upon receiving a transfer request. The authentication component 130 generates and sends a registration payer one-time passcode (OTP) to the payer. In some embodiments, the registration payer OTP is time-limited such that the registration payer OTP must be returned within a time period from sending. The authentication component 130 receives the registration payer OTP to successfully authenticate and register the payer to generate and send transfer requests and/or transfers. In some embodiments, the payer confirms payer account information and/or other information such as mobile number while returning the registration payer OTP.

The authentication component 130 generates and sends a registration payee OTP to the payee. In some embodiments, the registration payee OTP is time-limited such that the registration payee OTP must be returned within a time period from sending. The authentication component 130 receives the registration payee OTP to successfully authenticate and register the payee to receive transfers. In some embodiments, the payee confirms payee account information and/or other information such as mobile number while returning the registration payee OTP.

In some embodiments, the authentication component 130 can authenticate the payer and/or payee using biometric data. The authentication component 130 can request biometric data of the payer and/or payee. The authentication component 130 receives biometric data of the payer and/or payee. The authentication component 130 matches the biometric data to previously stored biometric data of the payer and/or payee associated with a relative accounts indicated in account information from the data component 120.

The system 100 includes a communication component 140. The communication component 140 opens a communication session between the payer and payee. In some embodiments, the communication component 140 opens the communication session in response to receiving a transfer request. In other embodiments, the communication component 140 opens the communication session after the payer and/or payee is authenticated. The communication session can be between a payer's computing device and a payee's computing device. For example, the communication session can be between two mobile devices, a computer and a mobile device, a website and a tablet, and/or the like and/or a combination thereof.

The communication component 140 generates and sends, via the communication session, a time-limited payee OTP to the payee to complete the funds transfer detailed in the transfer request. The communication component 140 receives the payee OTP within a first time limit associated with the time-limited payee OTP. If the sent OTP and the received OTP match, the communication component 140 can allow the funds to be received by the payee and/or released to the payee's financial institution.

The system 100 includes a transfer component 150. The transfer component 150 transfers the funds from the payer to the payee upon the communication component 140 receiving the time-limited payee OTP from the payee within the first time limit. In some embodiments, the transfer component 150 can be integrated into one or more financial institution systems to facilitate funds transfers. The transfer component 150 can direct deposit, wire transfer, blockchain transfer, distributed ledger transfer, and/or the like to the payee's account with a financial institution.

In some embodiments, the communication component 140 generates and sends, via the communication session, a time-limited payer OTP to the payer to complete the funds transfer detailed in the transfer request. The communication component 140 receives the payer OTP within a second time limit associated with the time-limited payer OTP. If the sent OTP and the received OTP match, the communication component 140 can allow the funds to be received by the payee and/or released to the payee's financial institution. In other embodiments, the communication component 140 receives the time limited payer OTP and the time limited payee OTP before allowing the transfer of funds. In some embodiments, the communication component 140 simultaneously sends the time-limited payer OTP and the time-limited payee OTP to the payer and the payee respectively.

In some embodiments, the communication component 140 connects the payer and the payee over a social network platform. The communication component 140 generates and sends the payee OTP and the payer OTP over a messaging service of the social network platform. In other embodiments, the communication component 140 determines the payee and payer are connected on the social network platform before opening the communication session.

In some embodiments, the funds transfer, the authentication, the receipt of the time-limited payee OTP and/or the time-limited payer OTP can be recorded by the data component 120 and/or a central depository. The recordation can be preserved for future proof in case one or more parties deny transferring and/or receiving the funds.

Figure 2:
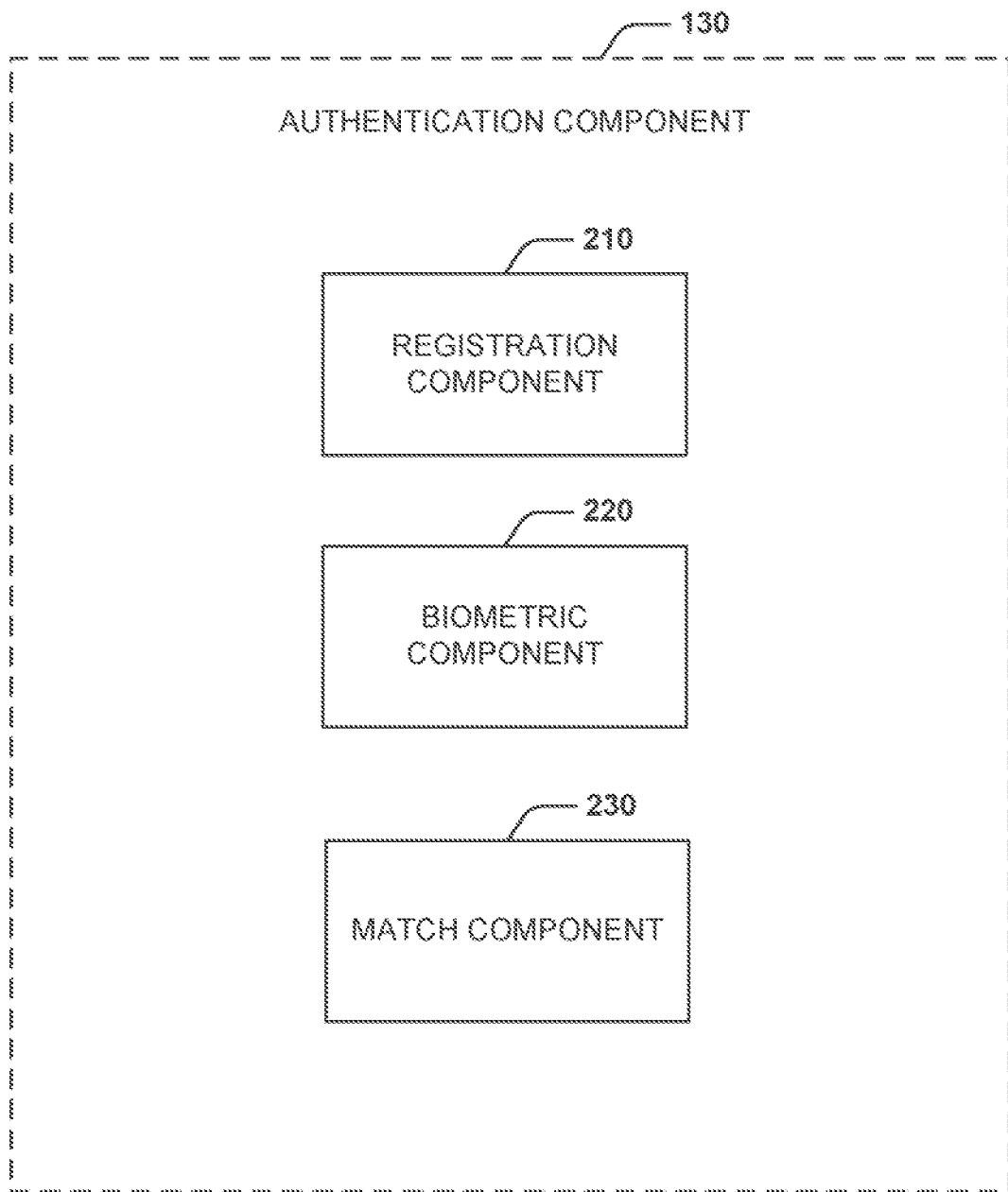
FIG. 2 illustrates an example component diagram of an authentication component.

FIG. 2 illustrates a detailed component diagram of the authentication component 130. The authentication component 130 includes a registration component 210. The registration component 210 can register the payer, the payee, and/or associated financial institutions of the payer and/or the payee. In some embodiments, the registration component 210 registers the payer and/or the payee to begin a funds transfer upon receiving a transfer request. The registration component 210 generates and sends a registration payer one-time passcode (OTP) to the payer.

In some embodiments, the registration payer OTP is time-limited such that the registration payer OTP must be returned within a time period from sending. The registration component 210 receives the registration payer OTP to successfully authenticate and register the payer to generate and send transfer requests and/or transfers. In some embodiments, the payer confirms payer account information and/or other information such as mobile number while returning the registration payer OTP.

The registration component 210 generates and sends a registration payee one-time passcode (OTP) to the payee. In some embodiments, the registration payee OTP is time-limited such that the registration payee OTP must be returned within a time period from sending. The registration component 210 receives the registration payee OTP to successfully authenticate and register the payee to receive transfers. In some embodiments, the payee confirms payee account information and/or other information such as mobile number while returning the registration payee OTP.

In some embodiments, the registration component 210 uses a predefined list of passcodes to send to a payer and/or payee. In other embodiments, the registration component 210 generates a passcode according to a randomized algorithm and/or the like. The one-time passcode can be a series of number, letters, phrases, and/or the like or combination thereof.

The authentication component 130 includes a biometric component 220 and a match component 230. In some embodiments, the biometric component 220 can authenticate the payer and/or payee using biometric data. The biometric component 220 can request biometric data of the payer and/or payee. The biometric component 220 receives biometric data of the payer and/or payee. The match component 230 matches the biometric data to previously stored biometric data of the payer and/or payee associated with a relative accounts indicated in account information from the data component 120.

Figure 3:
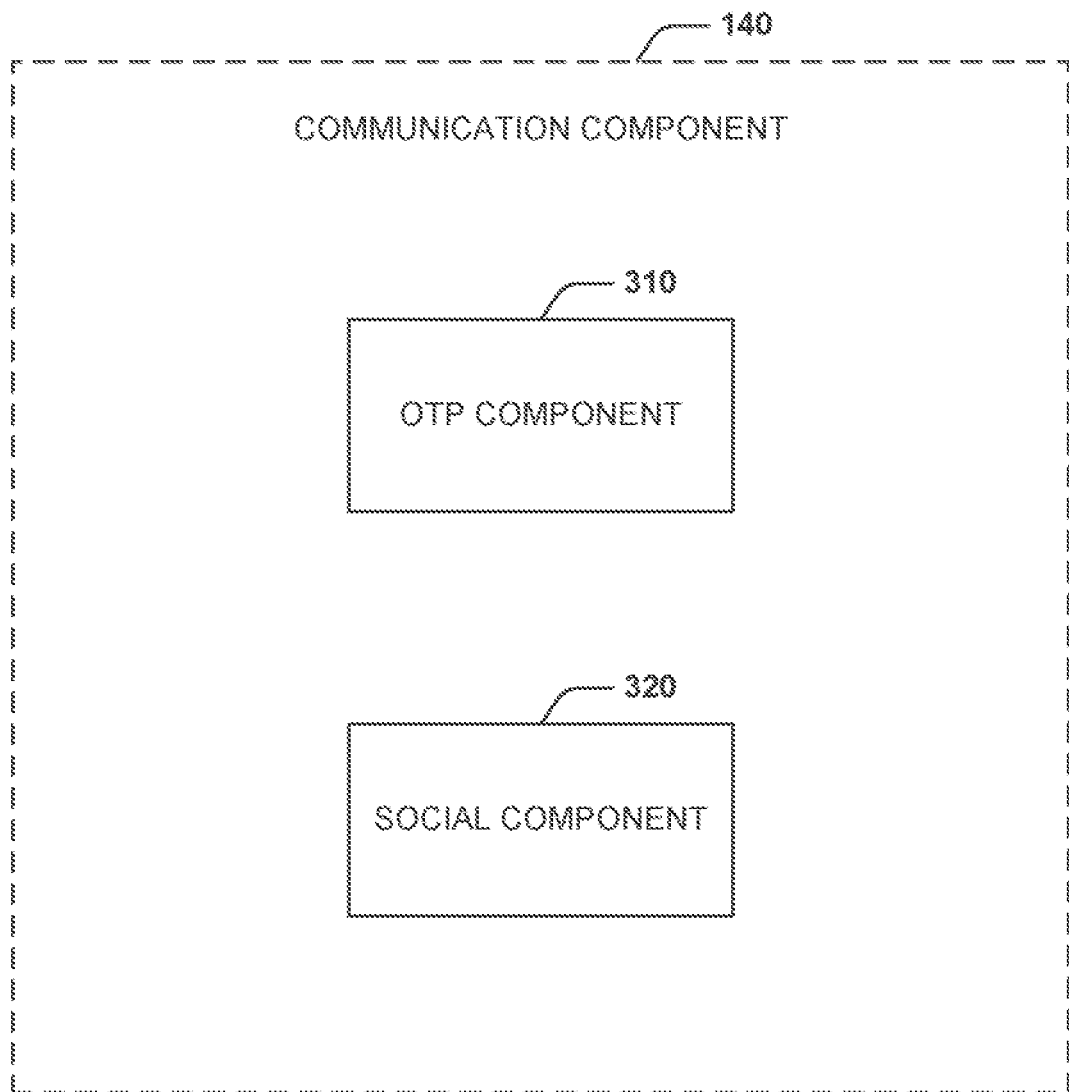
FIG. 3 illustrates an example component diagram of a communication component.

FIG. 3 illustrates a detailed component diagram of a communication component 140. The communication component 140 includes an OTP component 310. The OTP component 310 generates and sends, via the communication session, a time-limited payee OTP to the payee to complete the funds transfer detailed in the transfer request. The OTP component 310 receives the payee OTP within a first time limit associated with the time-limited payee OTP. If the sent OTP and the received OTP match, the 01P component 310 can allow the funds to be received by the payee and/or released to the payee's financial institution.

In some embodiments, the OTP component 310 generates and sends, via the communication session, a time-limited payer OTP to the payer to complete the funds transfer detailed in the transfer request. The OTP component 310 receives the payer OTP within a second time limit associated with the time-limited payer OTP. If the sent OTP and the received OTP match, the OTP component 310 can allow the funds to be received by the payee and/or released to the payee's financial institution. In other embodiments, the OTP component 310 receives the time limited payer OTP and the time limited payee OTP before allowing the transfer of funds. In some embodiments, the OTP component 310 simultaneously sends the time-limited payer OTP and the time-limited payee OTP to the payer and the payee respectively.

The communication component 140 includes a social component 320. In some embodiments, the social component 320 connects the payer and the payee over a social network platform. The OTP component 320 generates and sends the payee OTP and the payer OTP over a messaging service of the social network platform via the social component 320. In other embodiments, the social component 320 determines the payee and payer are connected on the social network platform before opening the communication session.

In some embodiments, the social component 320 opens a communication session between the payer and payee over the social network platform. The social component 320 opens the communication session in response to receiving a transfer request. The social component 320 opens the communication session after the payer and/or payee is authenticated and confirmed to be associated with one another on the social network platform. In some embodiments, the social component 320 can be integrated into the social network platform using an application programming interface (API) and can retrieve information using an API call and response.

Figure 4:
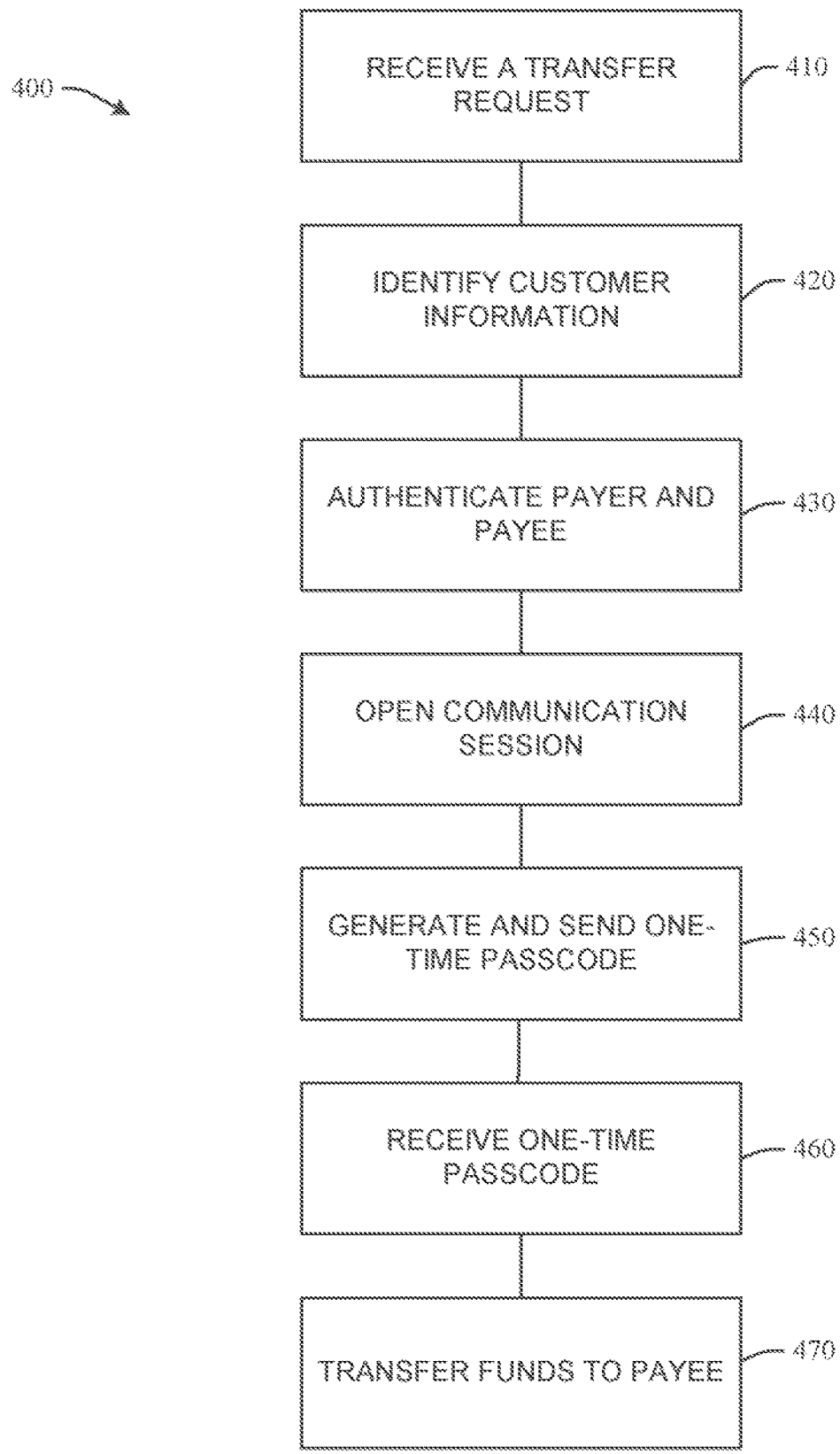
FIG. 4 illustrates a method for funds transfer authentication.

With reference to FIG. 4, example method 400 is depicted for authenticating a user to verify identity. While, for purposes of simplicity of explanation, the one or more methodologies shown herein. e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

FIG. 4 illustrates a method 400 for funds transfer authentication. At 410, a transfer request to transfer funds from a payer to a payee is received. The transfer request identifies the payer, the payee, and an amount to transfer. At 420, customer information associated respectively with the payer and the payee is identified. The customer information can include account information, contact information, social network data, and/or the like of the payer, the payee, associated financial institutions, and/or the like. The customer information can be mined from various sources and stored in a central depository.

At 430, the payer and the payee are authenticated and/or registered for the funds transfer. The payer and payee can be authenticated using a registration OTP, biometric matching, passwords, social network confirmation, and/or the like. The payer and payee can be registered by providing financial information to send and receive funds transfers. At 440, a communication session between the payer and payee is opened. The communication session can be between mobile devices of the payer and payee, computing devices, social network applications, websites, and/or the like and/or a combination thereof.

At 450, a time-limited payee OTP and a time-limited payer OTP is generated and sent to the payee and payer respectively. The OTPs can be generated according to a randomized algorithm to create a series of numbers, letters, symbols, phrases, and/or the like and/or a combination thereof. At 460, the time-limited payee OTP and a time-limited payer OTP are received within their respective time limits. If one or both OTPs are not received or are not received within the time limits, new OTPs can be generated or the transfer request can be canceled. At 470, if the OTPs are received within the time limits, the funds are transferred from the payer to the payee. The funds can be transferred from the payer financial institution or payer financial account to the payee's financial institution or payee financial account.

Figure 5:
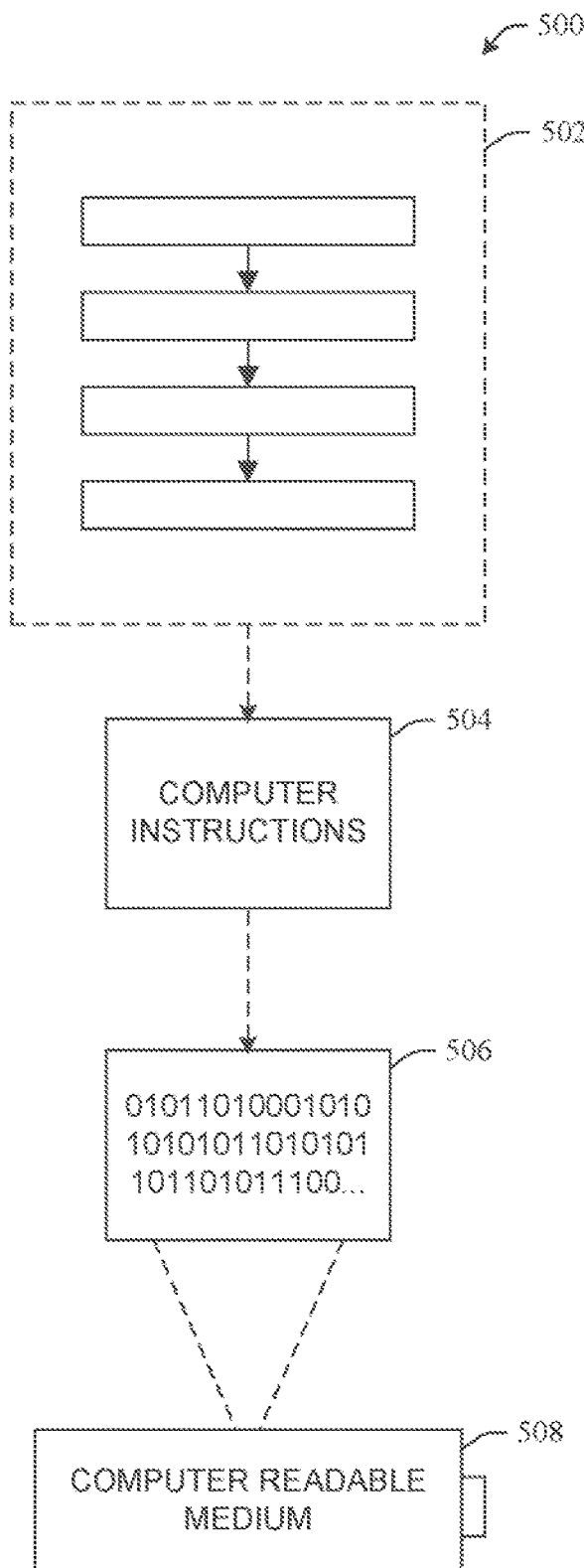
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
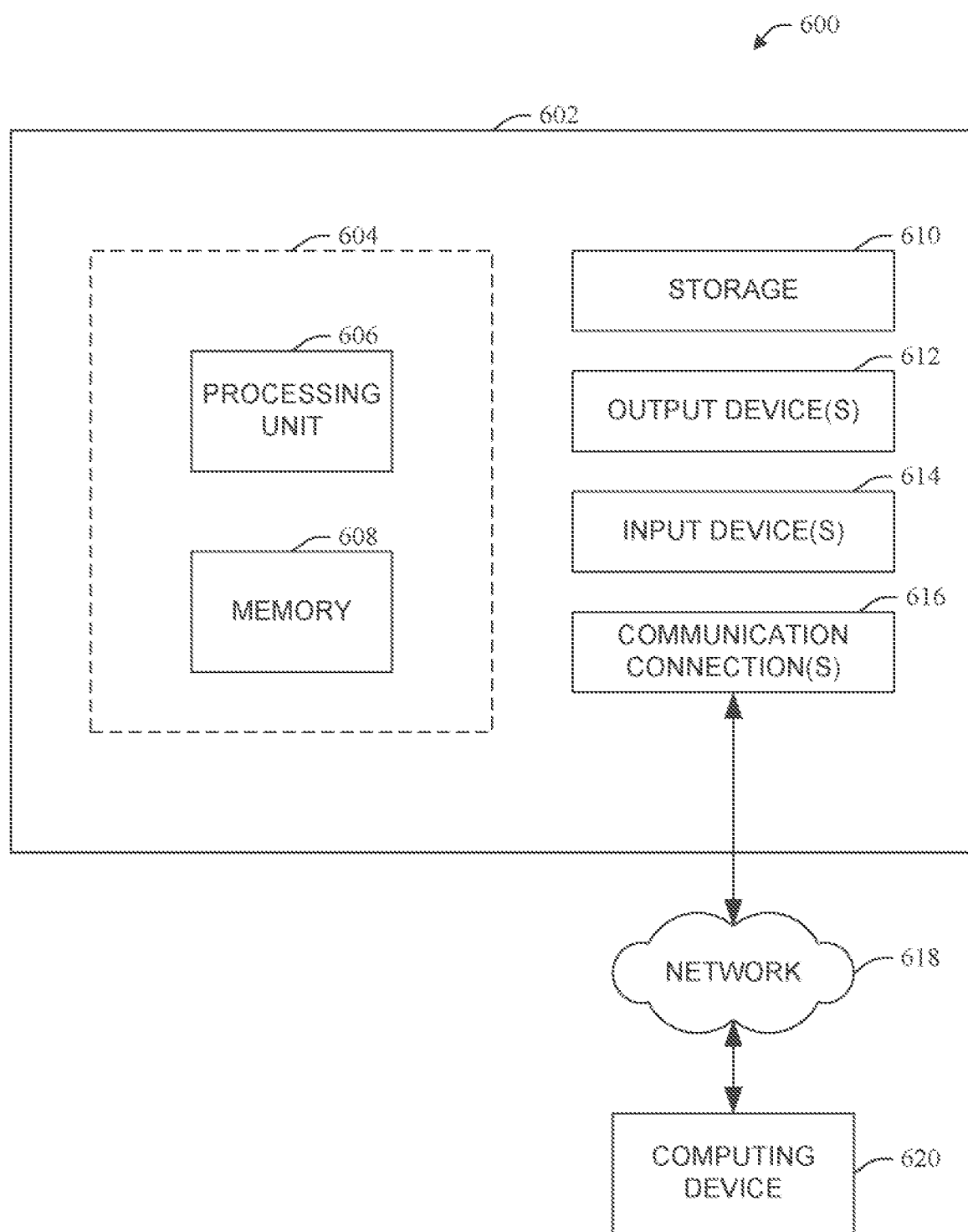
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet. or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method, comprising:
   receiving, by a financial institution system, a transfer request to electronically transfer funds from a payer to a payee, wherein the transfer request identifies the payer, the payee, and an amount to transfer;
   authenticating the payer and the payee, the authenticating comprising:
      opening a communication session between the payer and the payee, wherein the communication session connects a payer device and a payee device, wherein opening the communication session comprises:
         confirming, by the financial institution system, that the payer and the payee are associated on a social network platform before opening the communication session,
         connecting the payer and the payee on the communication session over the social network platform based on the confirmation,
         generating and sending, by the financial institution system, a time-limited payee one time passcode (OTP) to the payee over a messaging service of the social network platform, wherein the time-limited payee OTP includes a first time limit,
         receiving, by the financial institution system, the time-limited payee OTP within the first time limit from the payee device, wherein the payee is authenticated upon receiving the time-limited payee OTP from the payee device,
         generating and sending a time-limited payer OTP from the financial institution system to the payer over the messaging service of the social network platform, and
         receiving the time-limited payer OTP within a second time limit from the payer device, wherein the time-limited payer OTP and the time-limited payee OTP are sent simultaneously to the payer and the payee;
   electronically transferring the funds from the payer to the payee based on receiving the time-limited payee OTP from the payee device; and
   updating a distributed ledger to reflect the transfer of the funds from the payer to the payee.

2. The method of claim 1, wherein authenticating the payer and the payee comprises:
   determining a payee mobile number and a payer mobile number; and
   storing the payee mobile number and the payer mobile number in a central depository.

3. The method of claim 1, further comprising:
   registering the payee upon receiving the transfer request, the registering comprising:
      sending a registration payee OTP to the payee; and
      receiving the registration payee OTP and payee account information from the payee.

4. The method of claim 3, further comprising:
   authenticating the payee, the authentication comprising:
      receiving biometric data of the payee; and
      matching the biometric data to previously stored biometric data of the payee associated with a payee account indicated in the payee account information.

5. The method of claim 3, comprising:
   registering the payer to send the transfer request, the registering comprising:
      sending a registration payer OTP to the payer; and
      receiving the registration payer OTP and payer account information from the payer.

6. A system, comprising:
   one or more hardware processors having instructions to control one or more components, the components comprising:
      a request component that receives a transfer request to electronically transfer funds from a payer to a payee, the transfer request identifies the payer, the payee, and an amount to transfer;
      an authentication component that authenticates the payer and the payee, the authenticating comprising:
      a communication component that opens a communication session between the payer and the payee, wherein the communication session connects a payer device and a payee device, wherein opening the communication session comprises:
         confirming that the payer and the payee are associated on a social network platform before opening the communication session,
         connecting the payer and the payee on the communication session over the social network platform based on the confirmation,
         generating and sending a time-limited payee OTP to the payee over a messaging service of the social network platform, wherein the time-limited payee OTP includes a first time limit,
         receiving the time-limited OTP within the first time limit from the payee device, wherein the payee is authenticated upon receiving the time-limited payee OTP from the payee device,
         generating and sending a time-limited payer OTP from the financial institution system to the payer over the messaging service of the social network platform, and
         receiving the time-limited payer OTP within a second time limit from the payer device, wherein the time-limited payer OTP and the time-limited payee OTP are sent simultaneously to the payer and the payee;
      a transfer component that:
         electronically transfers the funds from the payer to the payee based on receiving the time-limited payee OTP, and
         updates a distributed ledger to reflect the transfer of the funds from the payer to the payee.

7. The system of claim 6, wherein the system further comprises:
   a data component that determines a payee mobile number and a payer mobile number; and
   a central depository that stores the payee mobile number and the payer mobile number.

8. The system of claim 6, wherein the authentication component comprises a registration component that registers the payee upon receiving the transfer request, and wherein the registration component:
   sends a registration payee OTP to the payee; and
   receives the registration payee OTP and payee account information from the payee.

9. The system of claim 8, the authentication component comprising:
   a biometric component that receives biometric data of the payee; and
   a match component that matches the biometric data to previously stored biometric data of the payee associated with a payee account indicated in the payee account information.

10. The system of claim 8, wherein the registration component registers the payer to send the transfer request, and wherein the registration component:
   sends a registration payer OTP to the payer; and
   receives the registration payer OTP and payer account information from the payer.

11. A non-transitory computer readable medium having instructions to control one or more processors configured to:
   receive a transfer request to electronically transfer funds from a payer to a payee, the transfer request identifies the payer, the payee, and an amount to transfer;
   authenticate the payer and the payee, the authenticating comprising:
      opening a communication session between the payer and the payee, wherein the communication session connects a payer device and a payee device, wherein opening the communication session comprises:
         confirming that the payee and the payer are associated on a social network platform before opening the communication session,
         connecting the payer and the payee on the communication session over the social network platform based on the confirmation,
         generating and sending a time-limited payee one time passcode (OTP) to the payee over a messaging service of the social network platform,
         receiving the time-limited payee OTP within a first time limit from the payee device, wherein the payee is authenticated upon receiving the time-limited payee OTP from the payee device,
         generating and sending a time-limited payer OTP from the financial institution system to the payer over the messaging service of the social network platform, and
         receiving the time-limited payer OTP within a second time limit from the payer device, wherein the time-limited payer OTP and the time-limited payee OTP are sent simultaneously to the payer and the payee;
      electronically transfer the funds from the payer to the payee based on receiving the time-limited payee OTP from the payee device; and
      update a distributed ledger to reflect the transfer of the funds from the payer to the payee.

12. The non-transitory computer readable medium of claim 11, wherein authenticating the payer and the payee comprises:
   determining a payee mobile number and a payer mobile number; and
   storing the payee mobile number and the payer mobile number in a central depository.

13. The non-transitory computer readable medium of claim 11, wherein the instructions are further configured to:
   register the payee upon receiving the transfer request, the registering comprising:
      sending a registration payee OTP to the payee; and
      receiving the registration payee OTP and payee account information from the payee.

14. The non-transitory computer readable medium of claim 13, wherein the instructions are further configured to:
   authenticate the payee, the authentication comprising:
      receiving biometric data of the payee; and
      matching the biometric data to previously stored biometric data of the payee associated with a payee account indicated in the payee account information.

* * * * *